US009424147B2

United States Patent
Raja et al.

(10) Patent No.: US 9,424,147 B2
(45) Date of Patent: Aug. 23, 2016

(54) SYSTEM AND METHOD FOR SUPPORTING MEMORY ALLOCATION CONTROL WITH PUSH-BACK IN A DISTRIBUTED DATA GRID

(71) Applicant: Oracle International Corporation, Redwood Shores, CA (US)

(72) Inventors: Harvey Raja, Manchester (GB); Robert H. Lee, San Carlos, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 27 days.

(21) Appl. No.: 14/298,458

(22) Filed: Jun. 6, 2014

(65) Prior Publication Data

US 2015/0169236 A1 Jun. 18, 2015

Related U.S. Application Data

(60) Provisional application No. 61/915,931, filed on Dec. 13, 2013.

(51) Int. Cl.
| | | |
|---|---|---|
| *G06F 12/00* | (2006.01) | |
| *G06F 11/20* | (2006.01) | |
| *G06F 12/02* | (2006.01) | |
| *G06F 17/30* | (2006.01) | |
| *G06F 9/48* | (2006.01) | |
| *G06F 12/08* | (2016.01) | |

(52) U.S. Cl.
CPC ...... *G06F 11/20* (2013.01); *G06F 9/48* (2013.01); *G06F 12/0253* (2013.01); *G06F 12/0868* (2013.01); *G06F 12/0871* (2013.01); *G06F 17/30* (2013.01); *G06F 12/0804* (2013.01); *G06F 2206/1014* (2013.01); *G06F 2212/1024* (2013.01); *G06F 2212/463* (2013.01)

(58) Field of Classification Search
CPC ... G06F 3/0679; G06F 3/0619; G06F 3/0631; G06F 12/0253; G06F 12/0871; G06F 12/0868; G06F 11/20; G06F 9/48; G06F 17/30; G11C 7/1072
USPC .......................................... 711/103; 707/813
See application file for complete search history.

(56) References Cited

U.S. PATENT DOCUMENTS

| | | | |
|---|---|---|---|
| 5,857,196 A | 1/1999 | Angle et al. | |
| 6,694,323 B2 | 2/2004 | Bumbulis | |
| 8,074,035 B1 * | 12/2011 | Per ..................... | G06F 11/1451 707/610 |

(Continued)

OTHER PUBLICATIONS

Harvey Raja, "Elastic Data", Mar. 21, 2013, retrieved from: <https://coherence.java.net/assets/pdf/2013-03 -21-Harvey-Raja-Elastic-Data-Overview.pdf> retrieved on Mar. 23, 2015, 26 pages.

(Continued)

*Primary Examiner* — Jasmine Song
(74) *Attorney, Agent, or Firm* — Tucker Ellis LLP

(57) ABSTRACT

A system and method can support memory allocation control in a distributed data grid. The system can designate a process, such as a logical process, to handle a request that is received from a client for storing data in a data storage using an elastic data structure with one or more journal files. Then, a resource manager associated with the data storage can suspend the process when the elastic data structure appears to be logically full. Furthermore, the resource manager can resume the suspended process associated with the client, after the resource manager has reclaimed sufficient memory from the elastic data structure.

18 Claims, 7 Drawing Sheets

(56) References Cited

U.S. PATENT DOCUMENTS

| | | |
|---|---|---|
| 2005/0278496 A1 | 12/2005 | Redestig |
| 2006/0036426 A1 | 2/2006 | Barr et al. |
| 2010/0011283 A1 | 1/2010 | Wray |
| 2013/0067190 A1 | 3/2013 | Gissel et al. |

OTHER PUBLICATIONS

European Patent Office, International Searching Authority, International Search Report and Written Opinion dated Feb. 25, 2015 for International Application No. PCT/US2014/067960, 11 pages.

European Patent Office, International Searching Authority, International Search Report and Written Opinion dated Dec. 22, 2015 for International Application No. PCT/US2015/052458, 17 pages.

Satish Palaniappan, "Efficient data transfer through zero copy Zero copy, zero overhead", © Copyright IBM Corporation 2008, Sep. 2, 2008, 10 pages.

Hrishikesh Amur et al., "Memory-Efficient GroupBy-Aggregate using Compressed Buffer Trees", Proceedings of the $4^{th}$ Annual Symposium on Cloud Computing, SoCC '13, Jan. 1, 2013, 16 pages.

* cited by examiner

SYSTEM AND METHOD FOR SUPPORTING MEMORY ALLOCATION CONTROL WITH PUSH-BACK IN A DISTRIBUTED DATA GRID

CLAIM OF PRIORITY

This application claims priority on U.S. Provisional Patent Application No. 61/915,931, entitled "SYSTEM AND METHOD FOR SUPPORTING MEMORY ALLOCATION CONTROL WITH PUSH-BACK IN A DISTRIBUTED DATA GRID" filed Dec. 13, 2013, which application is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS REFERENCE TO RELATED APPLICATIONS

This application is related to the following patent application:

U.S. patent application titled "SYSTEM AND METHOD FOR SUPPORTING ELASTIC DATA METADATA COMPRESSION IN A DISTRIBUTED DATA GRID", application Ser. No. 14/322,576, filed Jul. 2, 2014.

FIELD OF INVENTION

The present invention is generally related to computer systems, and is particularly related to a distributed data grid.

BACKGROUND

Modern computing systems, particularly those employed by larger organizations and enterprises, continue to increase in size and complexity. Particularly, in areas such as Internet applications, there is an expectation that millions of users should be able to simultaneously access that application, which effectively leads to an exponential increase in the amount of content generated and consumed by users, and transactions involving that content. Such activity also results in a corresponding increase in the number of transaction calls to databases and metadata stores, which have a limited capacity to accommodate that demand.

This is the general area that embodiments of the invention are intended to address.

SUMMARY

Described herein are systems and methods that can support memory allocation control in a distributed data grid. The system can designate a process, such as a logical process, to handle a request that is received from a client for storing data in a data storage using an elastic data structure with one or more journal files. Then, a resource manager associated with the data storage can suspend the process when the elastic data structure appears to be logically full. Furthermore, the resource manager can resume the suspended process associated with the client, after the resource manager has reclaimed sufficient memory from the elastic data structure.

DETAILED DESCRIPTION

Figure 1:
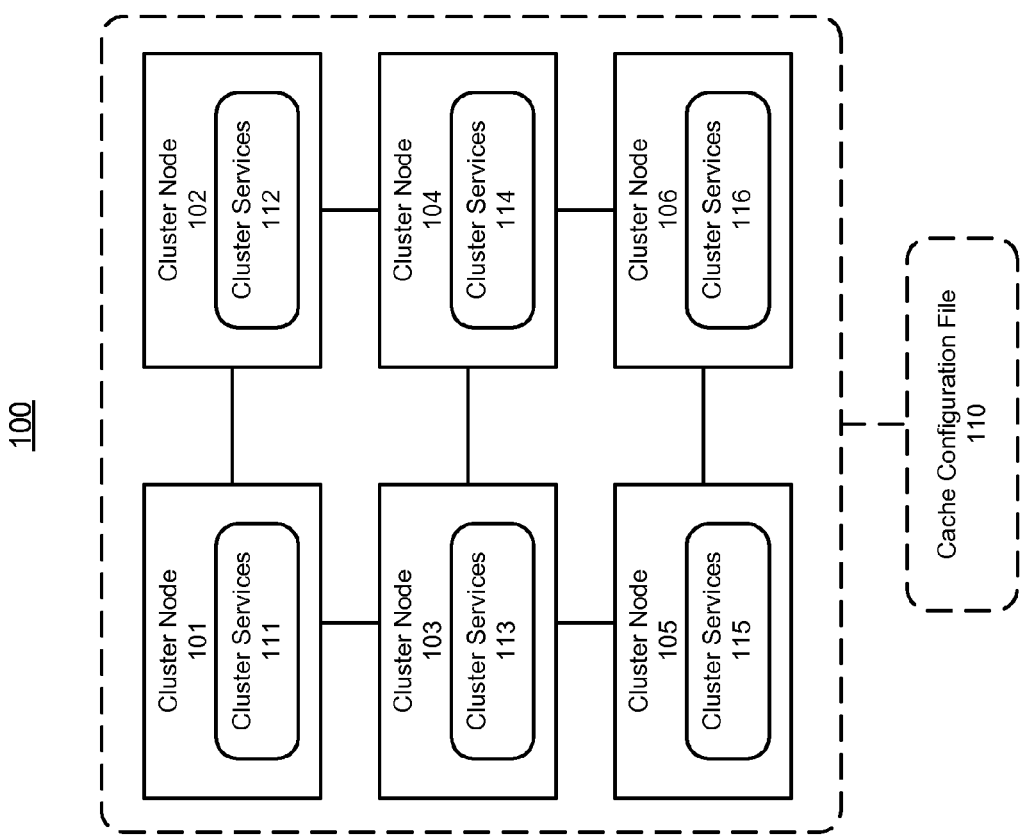
FIG. 1 is an illustration of a data grid cluster in accordance with various embodiments of the invention.

The invention is illustrated, by way of example and not by way of limitation, in the figures of the accompanying drawings in which like references indicate similar elements. It should be noted that references to "an" or "one" or "some" embodiment(s) in this disclosure are not necessarily to the same embodiment, and such references mean at least one.

The description of the invention as following uses the Oracle Coherence data grid as an example for a distributed data grid. It will be apparent to those skilled in the art that other types of distributed data grids can be used without limitation.

Described herein are systems and methods that can support memory allocation control with push-back in a distributed data grid.

Distributed Data Grid

In accordance with an embodiment, as referred to herein a "distributed data grid", "data grid cluster", or "data grid", is a system comprising a plurality of computer servers which work together to manage information and related operations, such as computations, within a distributed or clustered environment. The data grid cluster can be used to manage application objects and data that are shared across the servers. Preferably, a data grid cluster should have low response time, high throughput, predictable scalability, continuous availability and information reliability. As a result of these capabilities, data grid clusters are well suited for use in computational intensive, stateful middle-tier applications. Some examples of data grid clusters, e.g., the Oracle Coherence data grid cluster, can store the information in-memory to achieve higher performance, and can employ redundancy in keeping copies of that information synchronized across multiple servers, thus ensuring resiliency of the system and the availability of the data in the event of server failure. For example, Coherence provides replicated and distributed (partitioned) data management and caching services on top of a reliable, highly scalable peer-to-peer clustering protocol.

An in-memory data grid can provide the data storage and management capabilities by distributing data over a number of servers working together. The data grid can be middleware that runs in the same tier as an application server or within an application server. It can provide management and processing of data and can also push the processing to where the data is located in the grid. In addition, the in-memory data grid can eliminate single points of failure by automatically and transparently failing over and redistributing its clustered data management services when a server becomes inoperative or is disconnected from the network. When a new server is added, or when a failed server is restarted, it can automatically join the cluster and services can be failed back over to it, transparently redistributing the cluster load. The data grid can also include network-level fault tolerance features and transparent soft re-start capability.

In accordance with an embodiment, the functionality of a data grid cluster is based on using different cluster services. The cluster services can include root cluster services, partitioned cache services, and proxy services. Within the data grid cluster, each cluster node can participate in a number of cluster services, both in terms of providing and consuming the cluster services. Each cluster service has a service name that uniquely identifies the service within the data grid cluster, and a service type, which defines what the cluster service can do. Other than the root cluster service running on each cluster node in the data grid cluster, there may be multiple named instances of each service type. The services can be either configured by the user, or provided by the data grid cluster as a default set of services.

FIG. 1 is an illustration of a data grid cluster in accordance with various embodiments of the invention. As shown in FIG. 1, a data grid cluster 100, e.g. an Oracle Coherence data grid, includes a plurality of cluster nodes 101-106 having various cluster services 111-116 running thereon. Additionally, a cache configuration file 110 can be used to configure the data grid cluster 100.

Elastic Data Structure

Figure 2:
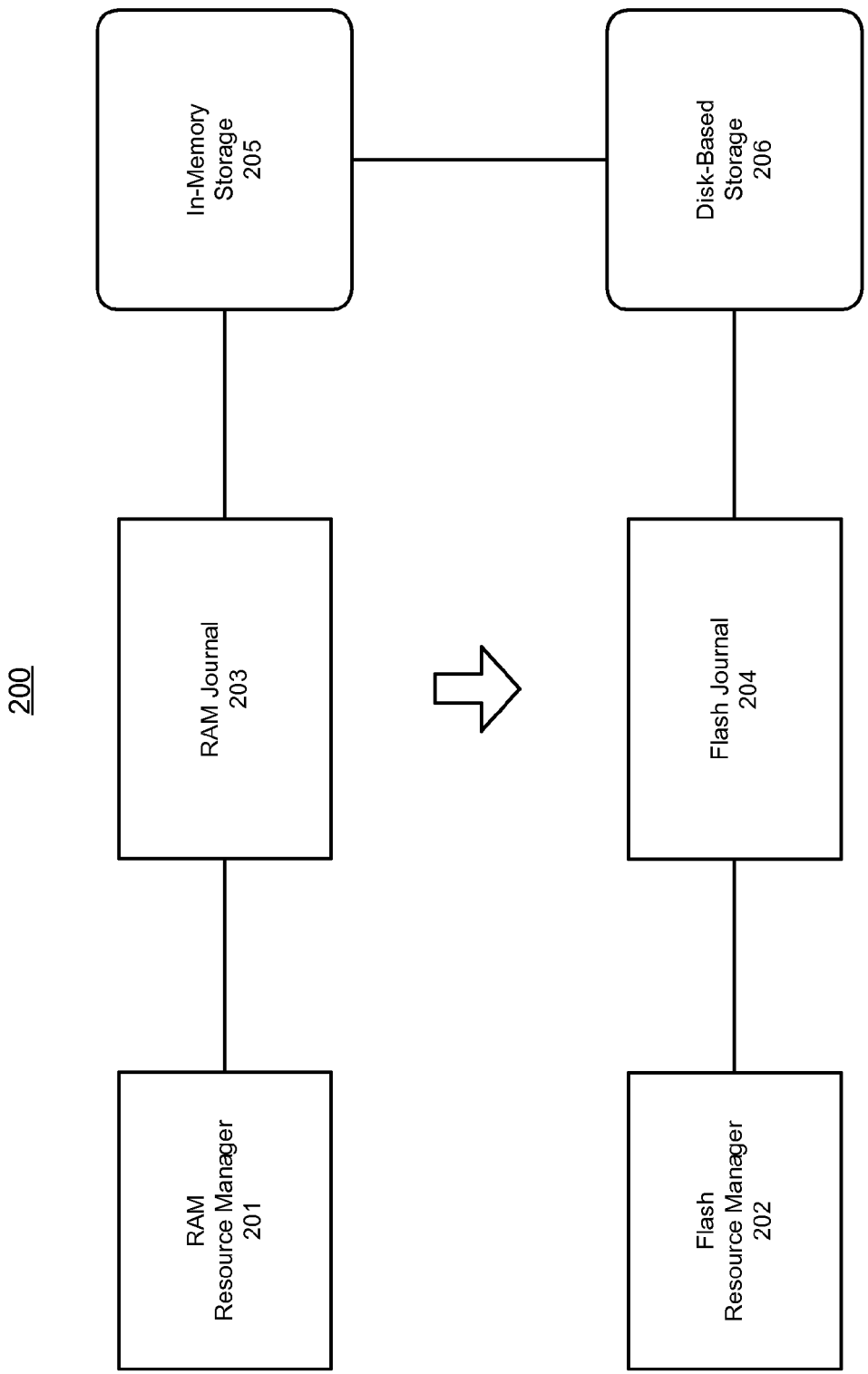
FIG. 2 shows an illustration of supporting elastic data structure in a distributed data grid, in accordance with an embodiment of the invention.

FIG. 2 shows an illustration of supporting an elastic data structure in a distributed data grid, in accordance with an embodiment of the invention. As shown in FIG. 2, a data grid cluster 200 can store information across different types of data storages. For example, the data storage can include in-memory storage 205, such as a random access memory (RAM), and/or disk-based devices 206, such as flash-based solid state disks (SSDs).

In accordance with an embodiment of the invention, the data grid cluster 200 can take advantage of an elastic data structure to seamlessly store data across memory and disk-based devices. For example, the elastic data structure enables the data grid cluster 200 to store data in the SSDs and/or read data from the SSDs at a near memory speed.

Furthermore, the elastic data structure can use a journaling technique to optimize the data storage across the different types of data storages. For example, the data grid cluster 200 can use the different journals 203-204 for recording state changes associated with a sequence of modifications on the different data storages 205-206.

As shown in FIG. 2, the data grid cluster 200 can use a RAM journal 203 for storing data in-memory and can use a flash journal 204 for storing data to the flash-based devices. Additionally, the RAM journal 203 can work with the flash journal 202 to enable seamless data overflow from the RAM storage to the flash disk storage.

Additionally, the system can use a RAM journal resource manager 201 for managing the RAM journal 203 and can use a flash journal resource manager 202 for managing the flash journal 204. Each of the different resource managers 201-202 can create, and utilize, a binary store for performing various operations, such as the read operations and write operations, on the different journals 203-204.

Furthermore, as shown in FIG. 2, the RAM journal resource manager 201 and the flash journal resource manager 202 can work seamlessly with each other. For example, when the RAM Journal 203 runs out of memory, the flash journal resource manager 202 allows the flash Journal 204 to automatically accept the overflow from the RAM Journal 203. Thus, the system allows the caches, which are based on the data grid cluster 200, to expand beyond the size of in-memory RAM storage 205.

In accordance with an embodiment of the invention, the RAM journal 203 and the flash journal 204 can be used for different purposes. For example, the RAM journal 203 and the flash journal 204 can be used for supporting backing maps and backup storage in the data grid cluster 200. Furthermore, the RAM journal 203 and the flash journal 204 can be used for supporting composite caches (e.g. a near cache).

Additionally, the data grid cluster 200 allows caches that use the RAM journal 203 and the flash journal 204 to be configured as part of a cache scheme definition within a cache configuration file. Also, the data grid cluster 200 allows a user to configure the journaling behavior by overriding the out-of-box configuration.

Memory Allocation Control with Push-back

Figure 3:
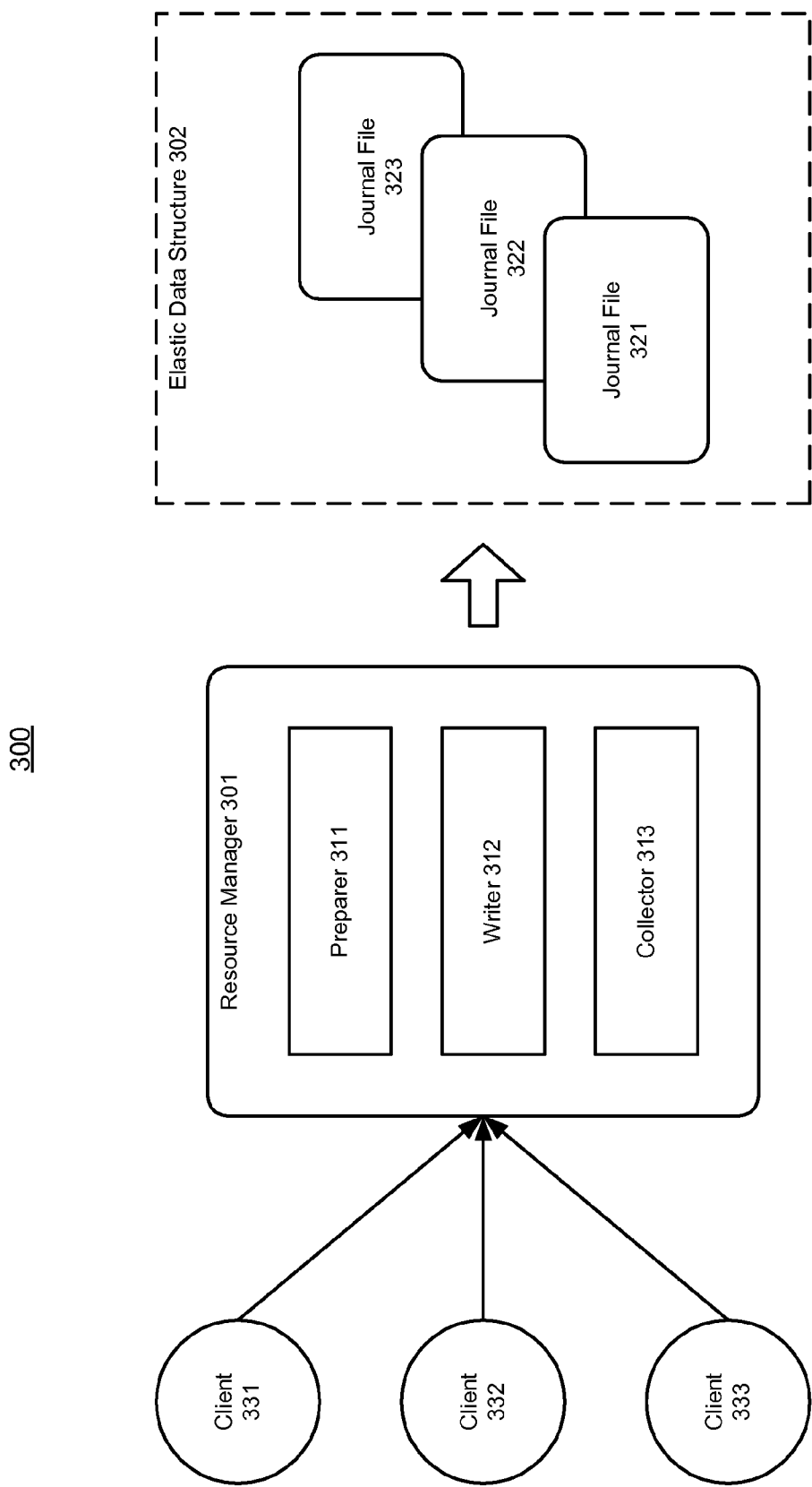
FIG. 3 shows an illustration of supporting memory allocation control in a distributed data grid, in accordance with an embodiment of the invention.

FIG. 3 shows an illustration of supporting memory allocation control in a distributed data grid, in accordance with an embodiment of the invention. As shown in FIG. 3, use a resource manager 301 in a distributed data grid 300 can use an elastic data structure 302 (e.g. including a journal with one or more journal files 321-323) for storing data across different types of data storages (e.g. in-memory storage and/or flash-based devices).

The resource manager 301 can use different threads for accessing the different journal files 321-323 in an elastic data structure 302. For example, the resource manager 301 can use a preparer 311 for handling multiple requests received from various clients 331-333 concurrently.

Additionally, the resource manager 301 can use a writer 312 for storing data in the elastic data structure 302 based on the received request from the clients 331-333. For example, the writer 312 can asynchronously write data in the elastic data structure 302.

Furthermore, the resource manager 301 can use a collector 313 to reclaim the memory in the different journal files 321-323 that are released by other threads.

Figure 4:
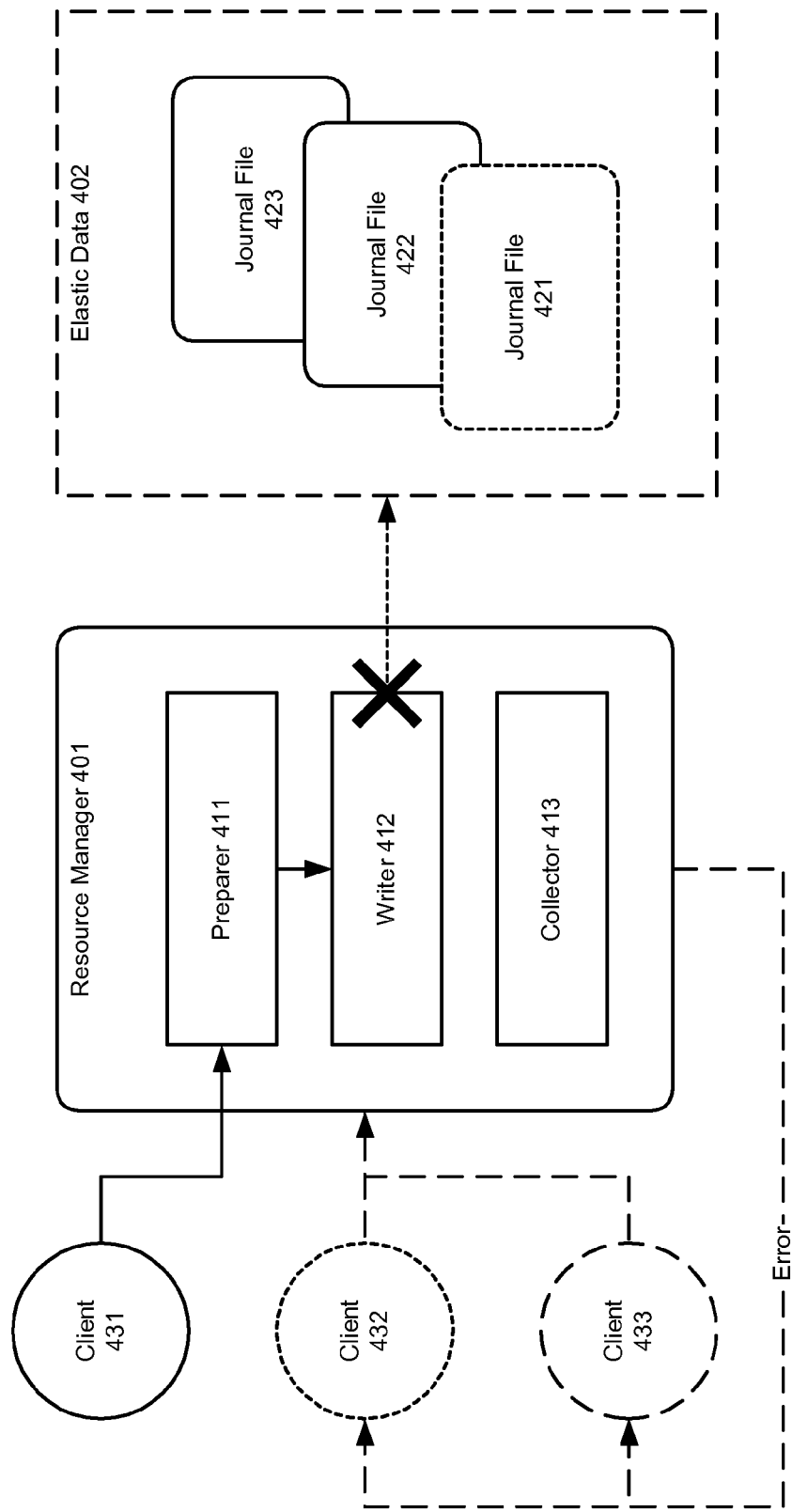
FIG. 4 shows an illustration of allocating memory in a distributed data grid when the journal is logically full, in accordance with an embodiment of the invention.

FIG. 4 shows an illustration of allocating memory in a distributed data grid when the journal is logically full, in accordance with an embodiment of the invention. As shown in FIG. 4, a distributed data grid 400 allows various clients 431-433 to use a resource manager 401 for accessing different journal files 421-423 in an elastic data structure 402.

The resource manager 401 can include different threads, such as a preparer 411, a writer 412, and a collector 413, which can access the elastic data structure 402 concurrently.

As shown in FIG. 4, a client 431 can request the resource manager 401 to store data using the elastic data structure 402. The preparer 411 can handle the request received from the client 431, and the writer 412 may attempt to perform a write operation on the elastic data structure 402. The writer 412 may forgo the write operation when the elastic data structure 402 appears to be full.

Additionally, the distributed data grid 400 may release the memory in the elastic data structure 402 when it is no longer in use. Here, the release of the memory can be logical only, and the resource manager 401 can use the journal collector 413 to concurrently reclaim the logical released memory in the elastic data structure 402.

As shown in FIG. 4, the journal file 421 may have memory that can be reclaimed while appearing logically full, since the journal collector 413 may not be aware that the journal file 421 has logically released memory, which can be reclaimed.

In such a case, when the resource manager 401 receives requests from the other clients 432-433 for storing data in the elastic data structure 402, the resource manager 401 can send these clients 432-433 an error message, which indicates that there is not sufficient memory available in the journal at the time of the request. As described in the above, these error messages may not always be accurate, since there can be logically released memory presented in the journal file 421 to be reclaimed.

Figure 5:
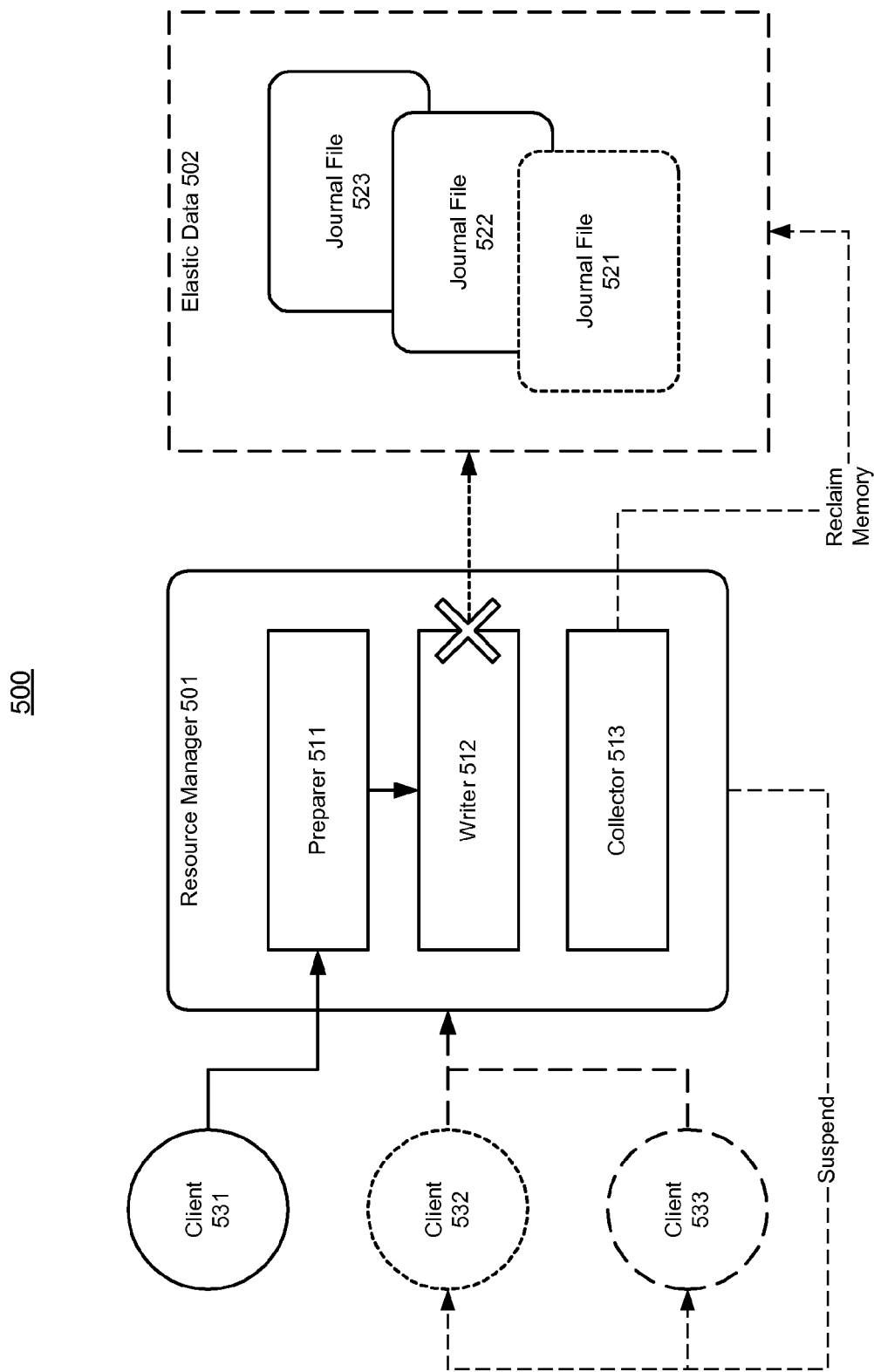
FIG. 5 shows an illustration of supporting memory allocation control with push-back in a distributed data grid, in accordance with an embodiment of the invention.

FIG. 5 shows an illustration of supporting memory allocation control with push-back in a distributed data grid, in accordance with an embodiment of the invention. As shown in FIG. 5, a distributed data grid 500 allows various clients 531-533 to use a resource manager 501 for accessing different journal files 521-523 in an elastic data structure 502.

The resource manager 501 can include different processes, such as logical processes, for servicing memory allocation. For example, these logical processes can include a preparer 511, a writer 512, and a collector 513, which can access the elastic data structure 502 concurrently.

In accordance with an embodiment of the invention, these logical processes can be realized, or implemented, using different threads. For example, a thread can be parked (or blocked) when there is contention in accessing the memory. Also, the thread can be awakened after another thread (i.e. process) releases the blocked memory.

As shown in FIG. 5, the preparer 511 can handle a request from the client 531 for storing data using the elastic data structure 502. Then, the writer 512 can be responsible for writing the data using the elastic data structure 502.

In accordance with an embodiment of the invention, the system allows the request received from the clients 531-533 to be asynchronous. Furthermore, when the elastic data structure 502 appears to be full, the system can push-back the asynchronous client requests and cause the client process to be suspended (or parked) until sufficient resources are reclaimed.

For example, the journal file 521 in the elastic data structure 502 may appears to be logically full, even though it may have logically released memory that can be reclaimed. In such a case, when the clients 532-533 send a request to the resource manager 501, the system can suspend the client processes 532-533 before sufficient memory is reclaimed.

Additionally, the resource manager 501 allows each different client request to register the amount of memory required.

As shown in FIG. 5, after being informed of the depleted state associated with the elastic data structure 502, the collector 513 can reclaim the released memory in the elastic data structure 502, e.g. in the journal file 521.

Figure 6:
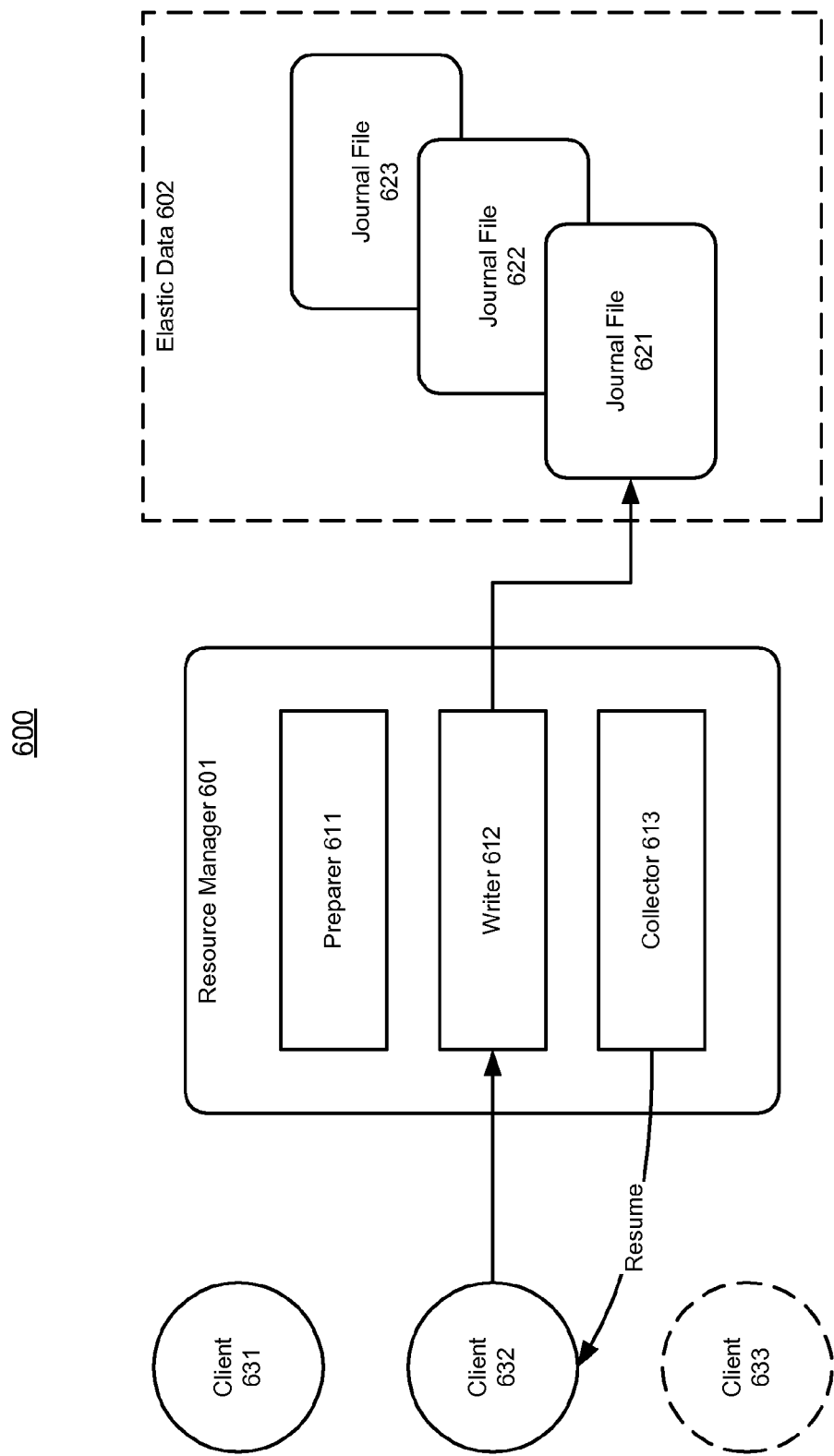
FIG. 6 shows an illustration of supporting memory allocation after sufficient memory has been reclaimed, in accordance with an embodiment of the invention.

FIG. 6 shows an illustration of supporting memory allocation after sufficient memory has been reclaimed, in accordance with an embodiment of the invention. As shown in FIG. 6, a distributed data grid 600 allows various clients 631-633 to use a resource manager 601 for accessing different journal files 621-623 in an elastic data structure 602.

The resource manager 601 can include different logical processes for servicing memory allocation. For example, these logical processes can include a preparer 611, a writer 612, and a collector 613, which can access the elastic data structure 602 concurrently. Additionally, the system can push-back the asynchronous client requests and cause the client threads to be parked before sufficient resources are reclaimed.

As shown in FIG. 6, after reclaiming sufficient memory from the elastic data structure 602, the collector 613 can resume (or wake up) the suspended client processes, such as the client 632. Then, the writer 612 (and/or the preparer 611) can process the request. For example, the writer 612 can store data in the journal file 621 using the memory that was successfully reclaimed.

In accordance with an embodiment of the invention, the system can provide a natural flow control based on resource utilization, the system knows the amount of memory that is needed for handling each of the service requests received from the clients 631-633.

Furthermore, the distributed data grid 600 can control the requests from various clients 631-633 using the garbage reclaiming mechanism, since the system allows both the storage request and garbage collection to be asynchronous operations. Unlike the traditional garbage collection (GC) mechanisms, the incremental collection of the released memory in the distributed data grid 600 (i.e. the journal) reduces the likelihood of a garbage collector becoming overly aggressive and allows for latency optimizations.

Thus, the elastic data structure 602 can function at the maximum rate that is allowed by the device without resulting in errors. Also, the elastic data structure 602 can accommodate high-throughput, resource-intensive applications with an extensive scalability.

Figure 7:
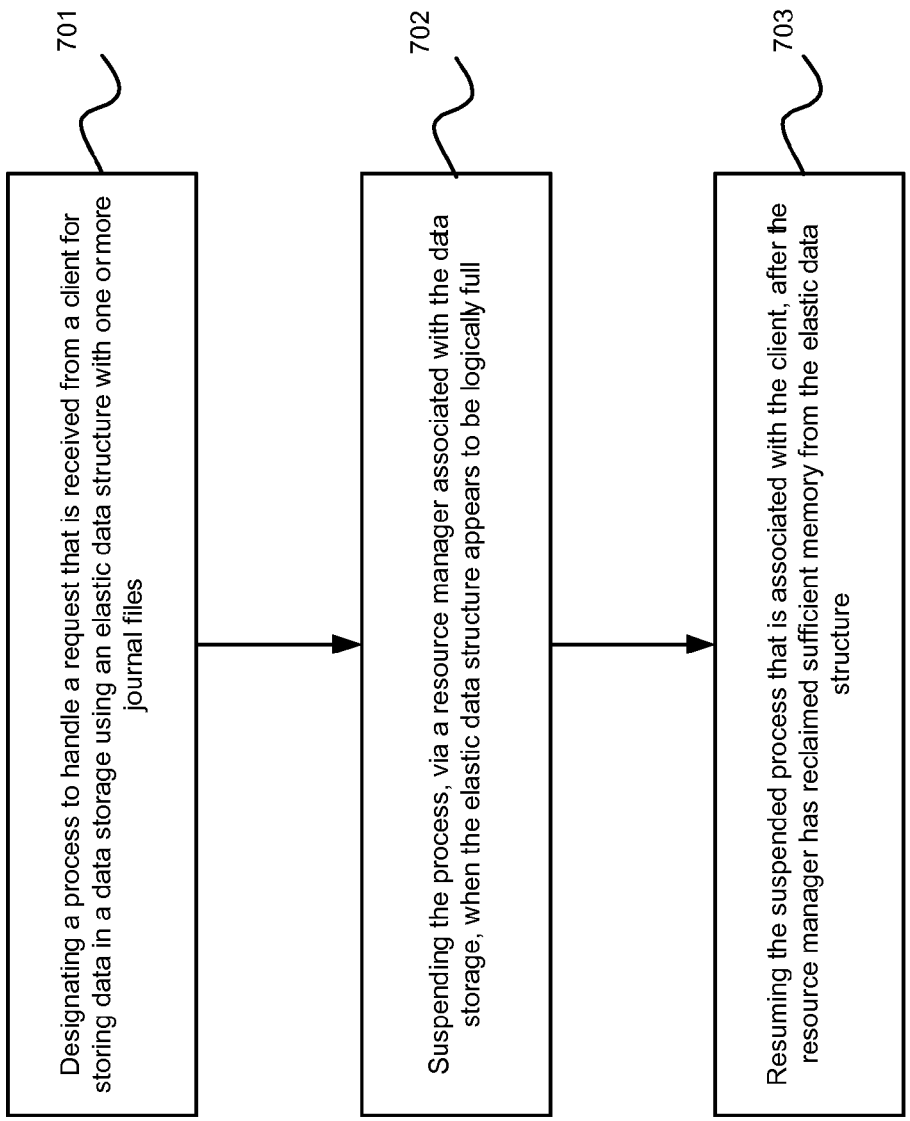
FIG. 7 illustrates an exemplary flow chart for supporting memory allocation control with push-back in a distributed data grid, in accordance with an embodiment of the invention.

FIG. 7 illustrates an exemplary flow chart for supporting memory allocation control with push-back in a distributed data grid, in accordance with an embodiment of the invention. As shown in FIG. 7, at step 701, the system can designate a process, such as a logical process, to handle a request that is received from a client for storing data in a data storage using an elastic data structure with one or more journal files. Then, at step 702, a resource manager associated with the data storage can suspend the process, when the elastic data structure appears to be logically full. Furthermore, at step 703, the resource manager can resume the suspended process associated with the client, after the resource manager has reclaimed sufficient memory from the elastic data structure.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The modification and variation include any relevant combination of the described features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for supporting memory allocation control in a distributed data grid, comprising:
   designating a process to handle a request that is received from a client for storing data in a data storage using an elastic data structure with one or more journal files;
   registering, via a thread associated with the process, an amount of memory that is required for handling the request;
   notifying the client, via a resource manager associated with the data storage, that there is not sufficient memory for handling the request;
   suspending the process, via the resource manager associated with the data storage, when the elastic data structure with one or more journal files does not have sufficient memory for handling the request;
   notifying a collector that the elastic data structure does not have sufficient memory to handle the request, the collector being associated with the resource manager;
   reclaiming, by the collector associated with the resource manager, sufficient memory to handle the request; and
   resuming the suspended process that is associated with the client, after the collector associated with the resource manager has reclaimed sufficient memory from the elastic data structure;
   wherein the one or more journal files are used to record state changes associated with a sequence of modifications on the data storage of the distributed data grid, the sequence of modifications being associated with the request, the data storage comprising at least an in-memory storage device and a disk-based storage device.

2. The method according to claim 1, further comprising:
   using the resource manager to handle a plurality of client requests from different clients, wherein the resource manager includes a preparer, a writer and the collector.

3. The method according to claim 2, further comprising:
   notifying the collector that the elastic data structure appears to be logically full or that the journal is in a depleted state.

4. The method according to claim 2, further comprising:
   reclaiming, via the collector, released memory in said one or more journal files in the elastic data structure.

5. The method according to claim 4, further comprising:
   allowing memory in said one or more journal files in the elastic data structure to be released only logical before being reclaimed by the collector.

6. The method according to claim 2, further comprising:
   using the writer to write data into said one or more journal files in the elastic data structure for the client.

7. The method according to claim 1, further comprising:
   providing a natural flow control based on resource utilization.

8. The method according to claim 1, further comprising:
   allowing the resource manager to be a RAM journal resource manager.

9. The method according to claim 8, further comprising:
   allowing the resource manager to be a flash journal resource manager.

10. A system for supporting memory allocation control in a distributed data grid, comprising:
    one or more microprocessors;
    the distributed data grid, which runs on the one or more microprocessors, that operates to
       designate a process to handle a request that is received from a client for storing data in a data storage using an elastic data structure with one or more journal files;
       register, via a thread associated with the process, an amount of memory that is required for handling the request;
       notify the client, via a resource manager associated with the data storage, that there is not sufficient memory for handling the request;
       suspend the process, via the resource manager associated with the data storage, when the elastic data structure does not have sufficient memory for handling the request;
       notifying a collector that the elastic data structure does not have sufficient memory to handle the request, the collector being associated with the resource manager;
       reclaim, by the collector associated with the resource manager, sufficient memory to handle the request; and
       resume the suspended process associated with the client, after the collector associated with the resource manager has reclaimed sufficient memory from the elastic data structure;
    wherein the one or more journal files are used to record state changes associated with a sequence of modifications on the data storage of the distributed data grid, the sequence of modifications being associated with the request, the data storage comprising at least an in-memory storage device and a disk-based storage device.

11. The system according to claim 10, wherein:
    the resource manager operates to handle a plurality of client requests from different clients, wherein the resource manager includes a preparer, a writer and the collector.

12. The system according to claim 11, wherein:
    the resource manager operates to notify the collector that the elastic data structure appears to be logically full or that the journal is in a depleted state.

13. The system according to claim 11, wherein:
    the collector operates to recover released memory as indicated in said one or more journal files in the elastic data structure.

14. The system according to claim 13, wherein:
    memory in said one or more journal files in the elastic data structure are released only logical before being reclaimed by the collector.

15. The system according to claim 10, wherein:
    the thread operates to use the writer to write data into said one or more journal files in the elastic data structure for the client.

16. The system according to claim 15, wherein:
    a natural flow control is provided based on resource utilization.

17. The system according to claim 10, wherein:
    the resource manager is a RAM journal resource manager and/or a flash journal resource manager.

18. A non-transitory machine readable storage medium having instructions stored thereon for supporting memory allocation control in a distributed data grid that when executed cause a system to perform the steps comprising:
- designating a process to handle a request that is received from a client for storing data in a data storage using an elastic data structure with one or more journal files;
- registering, via a thread associated with the process, an amount of memory that is required for handling the request;
- notifying the client, via a resource manager associated with the data storage, that there is not sufficient memory for handling the request;
- suspending the process, via a resource manager associated with the data storage, when the elastic data structure with one or more journal files does not have sufficient memory for handling the request;
- notifying a collector that the elastic data structure does not have sufficient memory to handle the request, the collector being associated with the resource manager;
- reclaiming, by the collector associated with the resource manager, sufficient memory to handle the request; and
- resuming the suspended process that is associated with the client, after the collector associated with the resource manager has reclaimed sufficient memory from the elastic data structure;
- wherein the one or more journal files are used to record state changes associated with a sequence of modifications on the data storage of the distributed data grid, the sequence of modifications being associated with the request, the data storage comprising at least an in-memory storage device and a disk-based storage device.

* * * * *